US011897166B2

(12) United States Patent
Testi et al.

(10) Patent No.: US 11,897,166 B2
(45) Date of Patent: Feb. 13, 2024

(54) METHOD FOR COMPACTING POWDER MATERIAL

(71) Applicant: SACMI COOPERATIVA MECCANICI IMOLA SOCIETA' COOPERATIVA, Imola (IT)

(72) Inventors: Paolo Testi, Imola (IT); Vanes Terziari, Imola (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 450 days.

(21) Appl. No.: 17/263,329

(22) PCT Filed: Aug. 1, 2019

(86) PCT No.: PCT/IB2019/056571
§ 371 (c)(1),
(2) Date: Jan. 26, 2021

(87) PCT Pub. No.: WO2020/026189
PCT Pub. Date: Feb. 6, 2020

(65) Prior Publication Data

US 2021/0276220 A1 Sep. 9, 2021

(30) Foreign Application Priority Data

Aug. 1, 2018 (IT) ........................ 102018000007737

(51) Int. Cl.
*B28B 5/02* (2006.01)
*B28B 3/12* (2006.01)
(Continued)

(52) U.S. Cl.
CPC .............. *B28B 5/027* (2013.01); *B28B 3/123* (2013.01); *B30B 11/22* (2013.01); *B44C 1/24* (2013.01); *B44F 9/02* (2013.01); *B44F 9/04* (2013.01)

(58) Field of Classification Search
CPC ........... B29B 5/027; B29B 5/06; B28B 3/123; B28B 3/126; B28B 3/12
See application file for complete search history.

(56) References Cited

U.S. PATENT DOCUMENTS

| | | | | |
|---|---|---|---|---|
| 3,850,558 | A | 11/1974 | Payraudeau | |
| 2019/0217501 | A1* | 7/2019 | Ricci | B28B 3/123 |
| 2019/0322005 | A1* | 10/2019 | Testi | B30B 5/06 |

FOREIGN PATENT DOCUMENTS

| | | |
|---|---|---|
| CN | 103817785 | 5/2014 |
| JP | 63235413 | 9/1988 |

(Continued)

OTHER PUBLICATIONS

International Search Report and Written Opinion for PCT/IB2019/056571 dated Nov. 14, 2019.

(Continued)

*Primary Examiner* — Kelly M Gambetta
*Assistant Examiner* — Virak Nguon
(74) *Attorney, Agent, or Firm* — Workman Nydegger

(57) ABSTRACT

A method for compacting ceramic powder; a layer of uncompacted ceramic powder is conveyed to a pressure device, which has a structured contact surface and comes into contact with the powder material so as to obtain a layer of compacted powder material having a structured surface; the pressure device comprises a first layer and a superficial layer arranged on the first layer; at least part of the superficial layer wears so as to uncover at least part of the first layer and obtain at least areas of the first outwardly exposed
(Continued)

layer the areas of the first outwardly exposed layer are hardened by means of irradiation with UV radiations.

22 Claims, 8 Drawing Sheets

(51) Int. Cl.

| | |
|---|---|
| ***B30B 11/22*** | (2006.01) |
| ***B44C 1/24*** | (2006.01) |
| ***B44F 9/02*** | (2006.01) |
| ***B44F 9/04*** | (2006.01) |

(56) References Cited

FOREIGN PATENT DOCUMENTS

| | | | | |
|---|---|---|---|---|
| JP | 04097906 | | 3/1992 | |
| WO | 2015-114433 | | 8/2015 | |
| WO | WO-2015114433 | A1 * | 8/2015 | ............... B28B 3/00 |
| WO | 2017216725 | | 12/2017 | |
| WO | 2018-073783 | | 4/2018 | |

OTHER PUBLICATIONS

International Preliminary Report on Patentability received for PCT Patent Application No. PCT/IB2019/056571, dated Feb. 11, 2021, 8 pages.
Office Action received for Indian Patent Application No. 202117006099, dated Jul. 26, 2021, 6 pages.
Communication about intention to grant a European patent received for European Application No. 19765329.8, dated Jan. 3, 2023, 6 pages.

* cited by examiner

METHOD FOR COMPACTING POWDER MATERIAL

CROSS-REFERENCE TO RELATED APPLICATIONS

This patent application is a 371 US Nationalization of PCT Application No. PCT/IB2019/056571, filed Aug. 1, 2019, which claims priority from Italian patent application no. 102018000007737, filed on Aug. 1, 2018, the entire disclosures of which are hereby incorporated herein by reference.

TECHNICAL FIELD

The present invention relates to a method for compacting powder material and to a procedure for manufacturing ceramic products.

BACKGROUND OF THE INVENTION

In the field of the production of ceramic articles the use is known of machines for compacting ceramic powder for the production of slabs, preferably thin (such as tiles) having a surface (typically the surface of the side destined to remain exposed) having a plurality of ridges and valleys. Normally, this type of surface is called structured or with structured effect.

The structured effect gives the ceramic product a particular aesthetic value and attractiveness, for example in the case of wishing to imitate the aesthetic effect of natural materials such as wood or stone.

In some cases, these machines comprise a compacting machine, which is arranged at a work station and is adapted to compact the powder material so as to obtain a layer of compacted powder material having a structured surface; and a conveyor assembly to substantially continuously convey the ceramic powder along a given path through the work station. The compacting machine comprises a pressure band having a structured contact surface adapted to compress the powder material from above to obtain the structured surface of the layer of compacted powder material.

The structured contact surface is subject to progressive wear due to prolonged contact with the powder material and must therefore be periodically replaced and at frequent intervals. Moreover, in the majority of cases, the need for replacement is only discovered after a given number of slabs of unacceptable quality have been produced. These slabs must be discarded.

It is also noted that a part of the slabs that are not discarded are not of homogeneous quality.

In this regard, it should be considered that the last slabs of a batch produced by a same belt (even if acceptable) have ridges of a lower height and valleys of a shallower depth when compared to the first slabs of the same batch. Moreover, the variation of the height and depth may be different from slab to slab or in a same slab.

The patent applications by the same applicant with publication numbers WO2015114433A1 and WO2018073783 describe a particular embodiment of the pressure band comprising a base layer on which a contact layer of polymer material is deposited having the structured contact surface adapted to create the desired (three-dimensional) relief geometry on the layer of powder material. In these cases, the drawbacks described above are particularly evident in view of the fact that the material with which the contact layer is made is relatively prone to wear.

The object of the present invention is to provide a method for compacting powder material and a procedure for manufacturing ceramic products, which allows the drawbacks of the prior art to be at least partially overcome and which are, at the same time, simple and economic to manufacture.

SUMMARY

According to the present invention a method for compacting powder material and a procedure for manufacturing ceramic products are provided as defined in the following independent claims and, preferably, in any one of the claims depending directly or indirectly on the independent claims.

BRIEF DESCRIPTION OF THE FIGURES

The invention is described below with reference to the accompanying drawings, which illustrate some non-limiting embodiments thereof, wherein.

DETAILED DESCRIPTION

Figure 1:
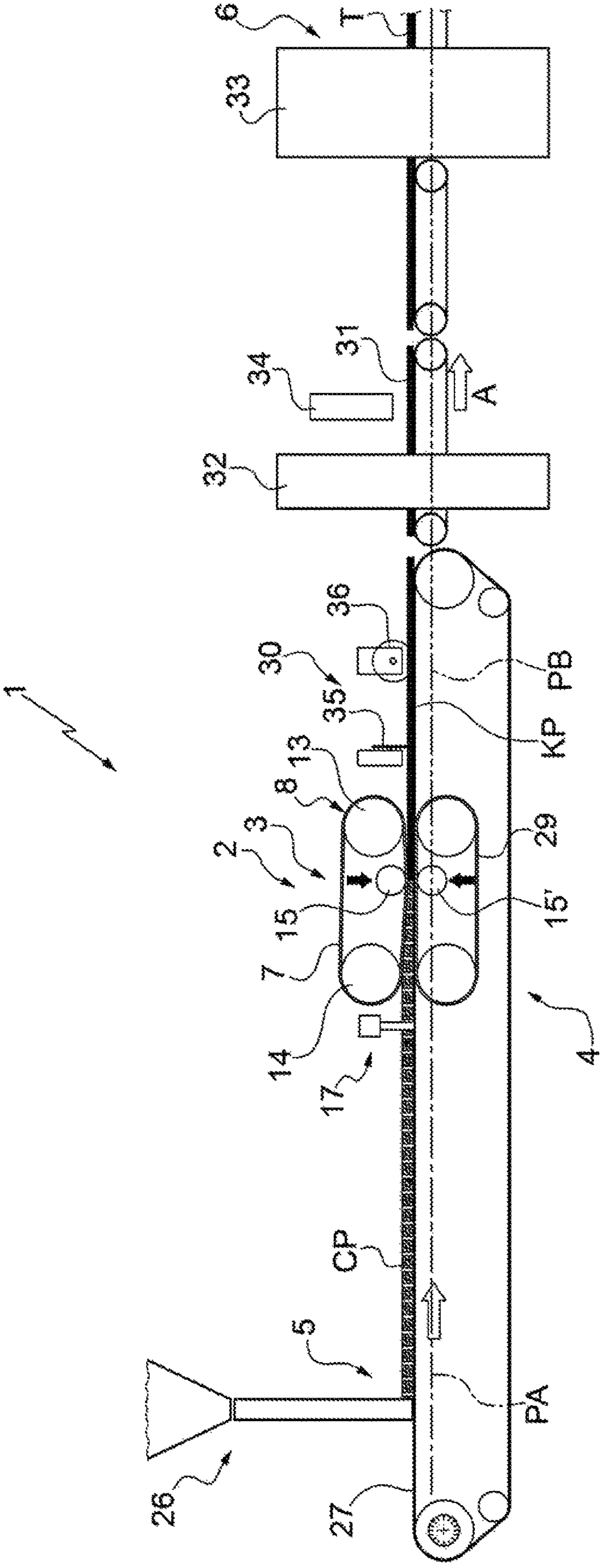
FIG. 1 is a schematic side view of a plant for implementing a procedure in accordance with the present invention.

In FIG. 1, the number 1 indicates, as a whole, a plant for manufacturing a ceramic product T. In particular, the ceramic product T is a slab (more precisely, a tile).

The plant 1 comprises a compaction machine 2, which is arranged at a work station 3 and is adapted to compact a powder material CP (comprising ceramic powder) so as to obtain a layer of compacted powder material KP having a structured surface; and a conveyor assembly 4 for conveying (in particular, substantially continuously) the powder material CP along a first segment PA of a given path (from an input station 5) to the work station 3 (in an advance direction A) and the layer of compacted ceramic powder KP from the work station 3 along a second segment PB of the given path (to an output station 6—in the direction A).

In particular, the conveyor assembly 4 is also adapted to support the powder material CP and the compacted powder material KP from below.

Normally, the given path consists of the segments PA and PB.

Figure 3:
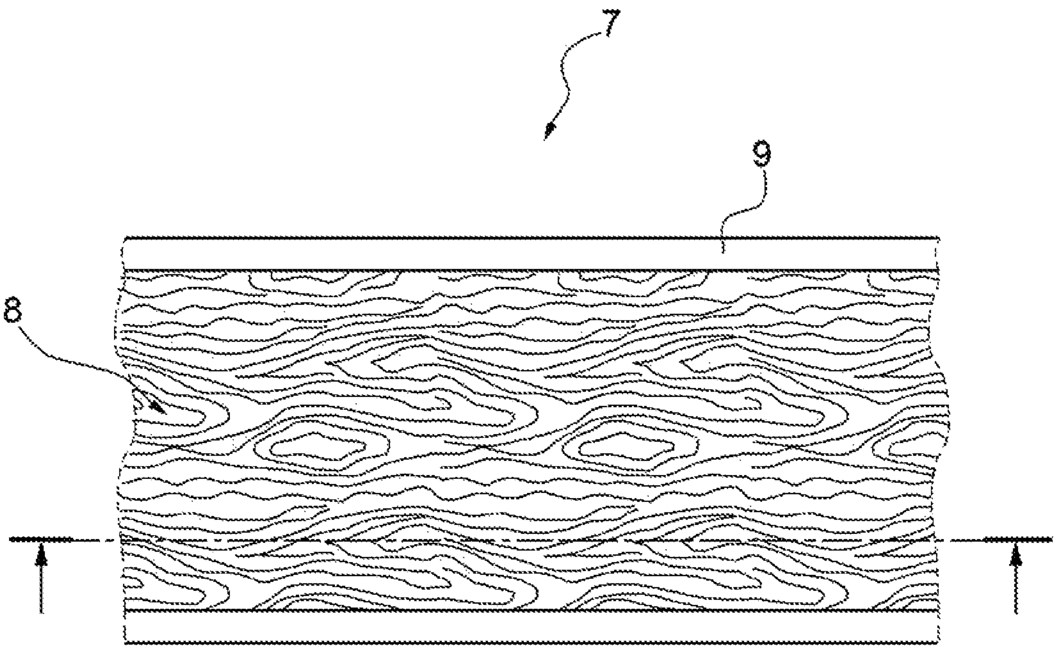
FIG. 3 is a plan view of a detail of the machine of FIG. 2.
Figure 4:
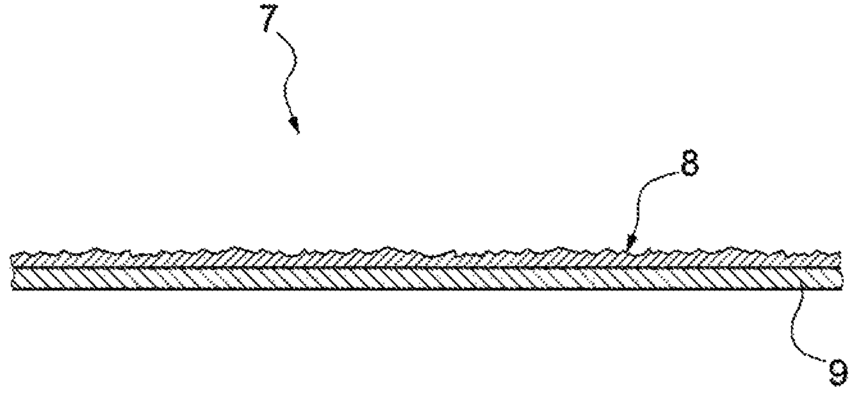
FIG. 4 is a cross-section on an enlarged scale of the detail of FIG. 3.

The compaction machine 2 comprises a pressure device 7 (see, in particular, FIGS. 3 and 4), which has a structured contact surface 8 and is adapted to come into contact with the powder material CP to obtain the structured surface of the layer of compacted powder material KP.

According to some non-limiting embodiments, the contact surface 8 (and/or the structured surface of the layer of compacted powder material KP) has ridge-valley height differences of up to 3 mm, more precisely up to 1 mm.

In particular, the contact surface 8 (and/or the structured surface of the layer of compacted powder material KP) has maximum ridge-valley height differences of at least 0.1 mm (more precisely, of at least 0.5 mm).

More precisely, the valleys and the ridges of the contact surface 8 are adapted to reproduce the aesthetic effect of natural materials such as wood and/or stone.

According to some non-limiting embodiments, the pressure device 7 has a (continuous) base layer 9. In some cases (not necessarily), the base layer 9 comprises (more precisely is made of) metal and/or a composite material, which, in turn, comprises fibreglass, carbon and/or Kevlar. In particular, the base layer 9 comprises (more precisely is made of) (stainless) steel.

Figure 5:
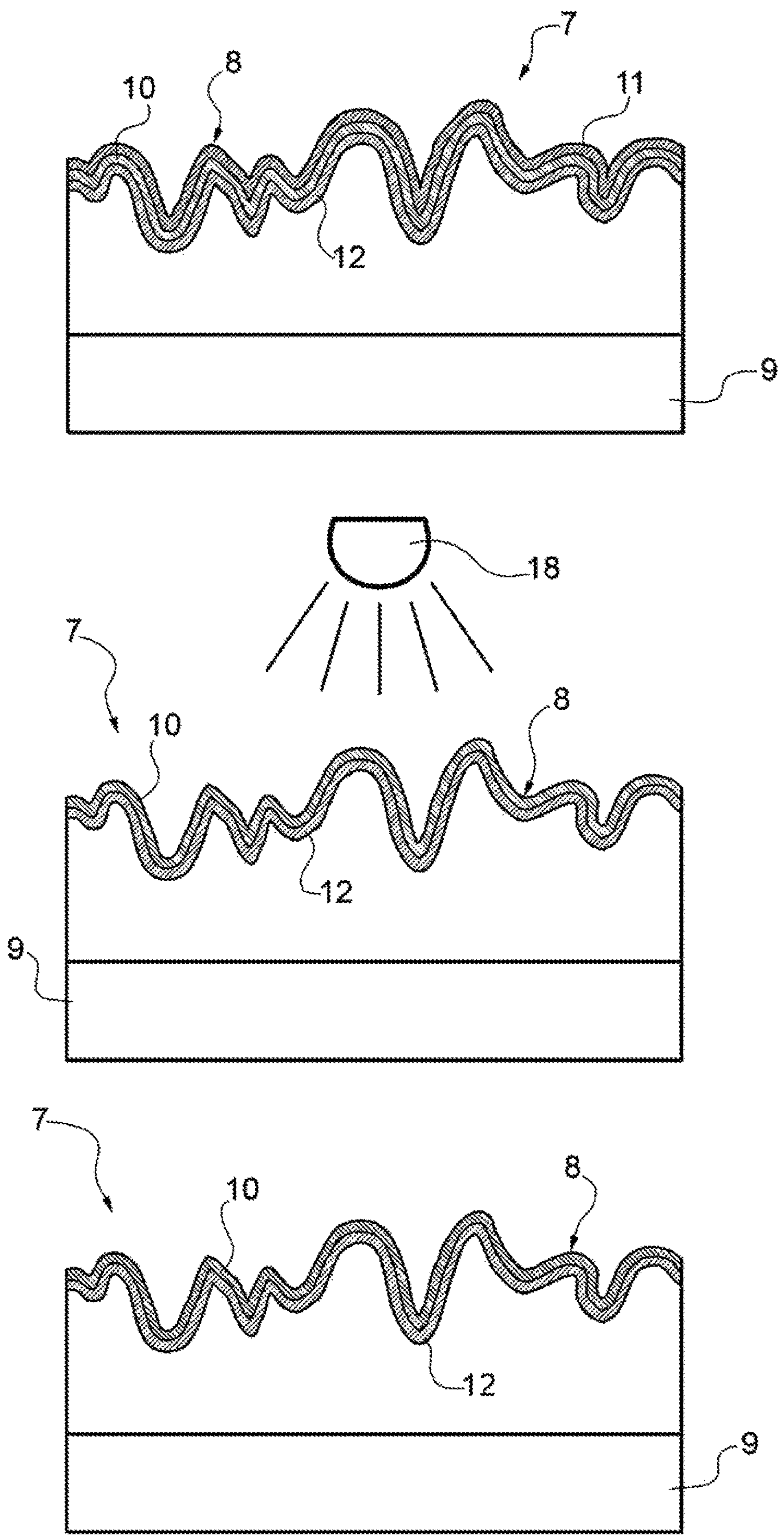
FIG. 5 schematically illustrates a part of the detail of FIG. 4 in subsequent operating steps.

With particular reference to FIG. 5, the pressure device 7 comprises at least one layer 10 and a superficial layer 11 arranged (on top of the layer 10) so as to cover the layer 10 at least partially relative to the outside (more precisely but not necessarily, the superficial layer 11 completely covers the layer 10).

In particular, the superficial layer 11 is in direct contact with the layer 10 (and is bonded thereto).

In particular, the layer 10 is arranged between the superficial layer 11 and the base layer 9.

According to some non-limiting embodiments, the layer 10 comprises (consists of) a polymer material, in particular one or more acrylic and/or epoxy polymers. In particular, the polymer material of the layer 10 comprises (consists of) one or more polymers as described in the patent application with publication number WO2016071304.

According to some non-limiting embodiments, the superficial layer 11 comprises (consists of) a polymer material, in particular one or more acrylic and/or epoxy polymers. In particular, the polymer material superficial layer 11 comprises (consists of) one or more polymers as described in the patent application with publication number WO2016071304.

Advantageously but not necessarily, the superficial layer 11 and the layer 10 comprise (are made of) the same material (more precisely, the same polymer material). Alternatively, the superficial layer 11 comprises (is made of) a different material relative to the material of which the layer 10 is comprised (made).

Advantageously but not necessarily, the pressure device 7 comprises at least one layer 12; the layer 10 is arranged (on top of the layer 12) so as to cover the layer 12 at least partially relative to the outside.

According to some non-limiting embodiments, the layer 12 comprises (consists of) a polymer material, in particular one or more acrylic and/or epoxy polymers. In particular, the polymer material of the layer 12 comprises (consists of) one or more polymers as described in the patent application with publication number WO2016071304.

Advantageously but not necessarily, the layer 12 and the layer 10 comprise (are made of) the same material (more precisely, the same polymer material).

Alternatively, the layer 12 comprises (is made of) a different material relative to the material of which the layer 10 is comprised (made).

In particular, the layer 12 is in direct contact with the layer 10 (and is bonded thereto).

In particular, the layer 12 is arranged between the layer 10 and the base layer 9.

According to some non-limiting embodiments, the polymer material of the layer 10 (and/or of the superficial layer 11 and/or of the layer 12) is obtained from an initial material that can be hardened (more precisely, cross-linkable). In particular, the initial material is photo-hardening, more in particular photo-hardening, photo-cross-linkable (even more in particular, which can be hardened if subjected to UV radiations).

Advantageously but not necessarily, the pressure device 7 comprises (more precisely, is) a pressure band. In particular, the pressure band is closed in on itself (in particular, in a loop).

Figure 2:
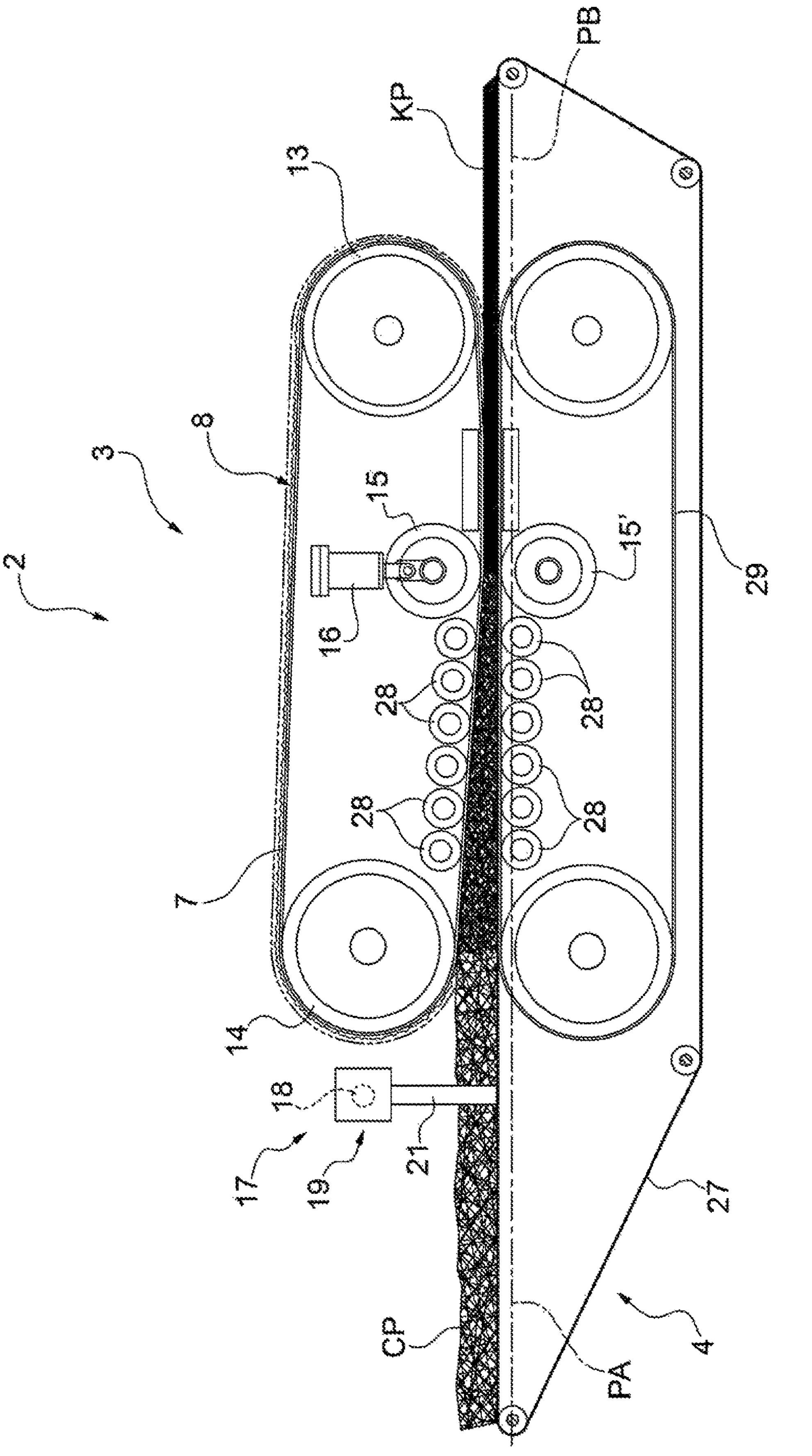
FIG. 2 is a schematic side view of a machine of the plant of FIG. 1 and adapted to implement a method in accordance to the present invention.
Figure 6:
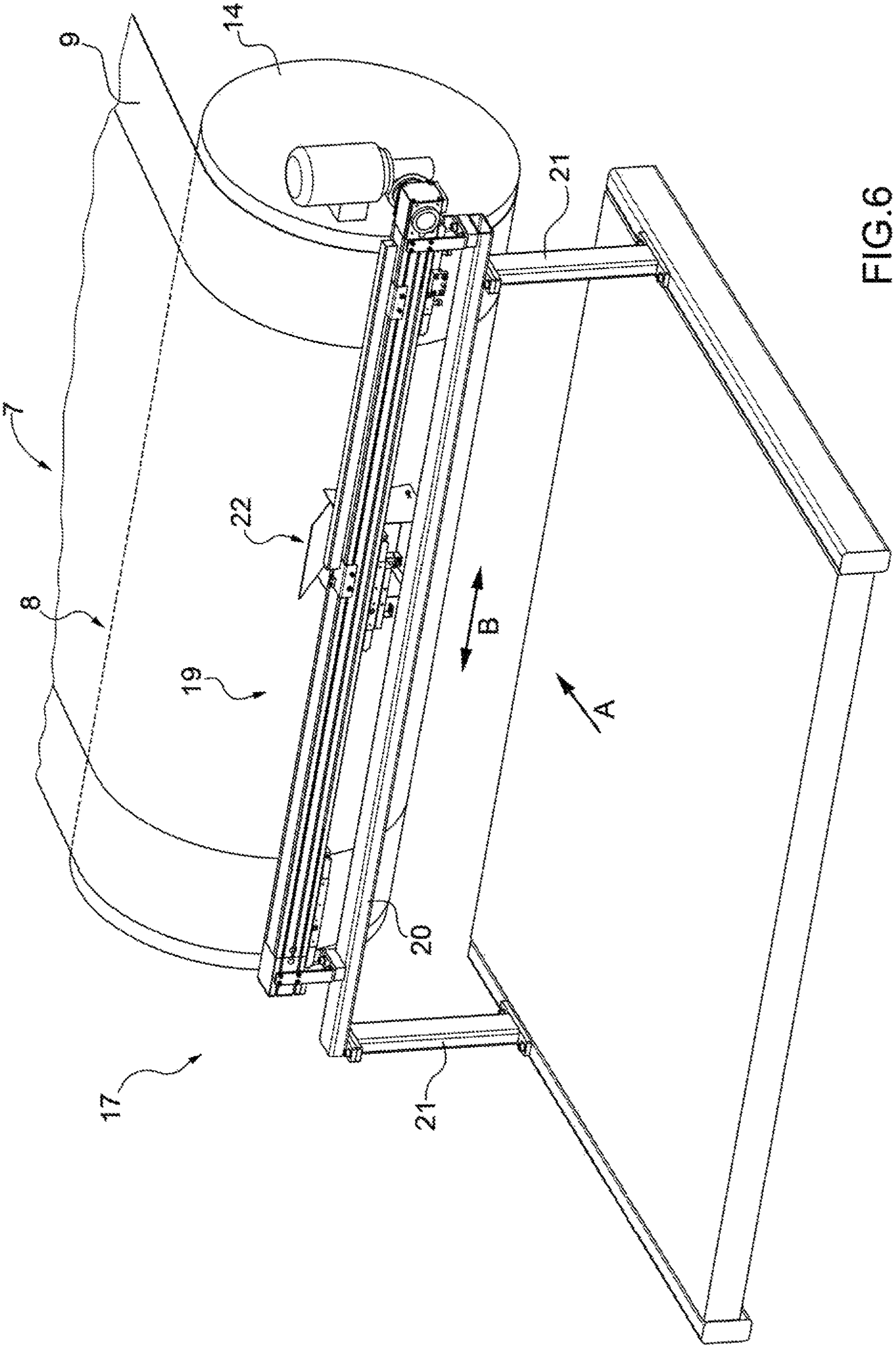
FIG. 6 is a perspective view of a part of the machine of FIG. 2.
Figure 7:
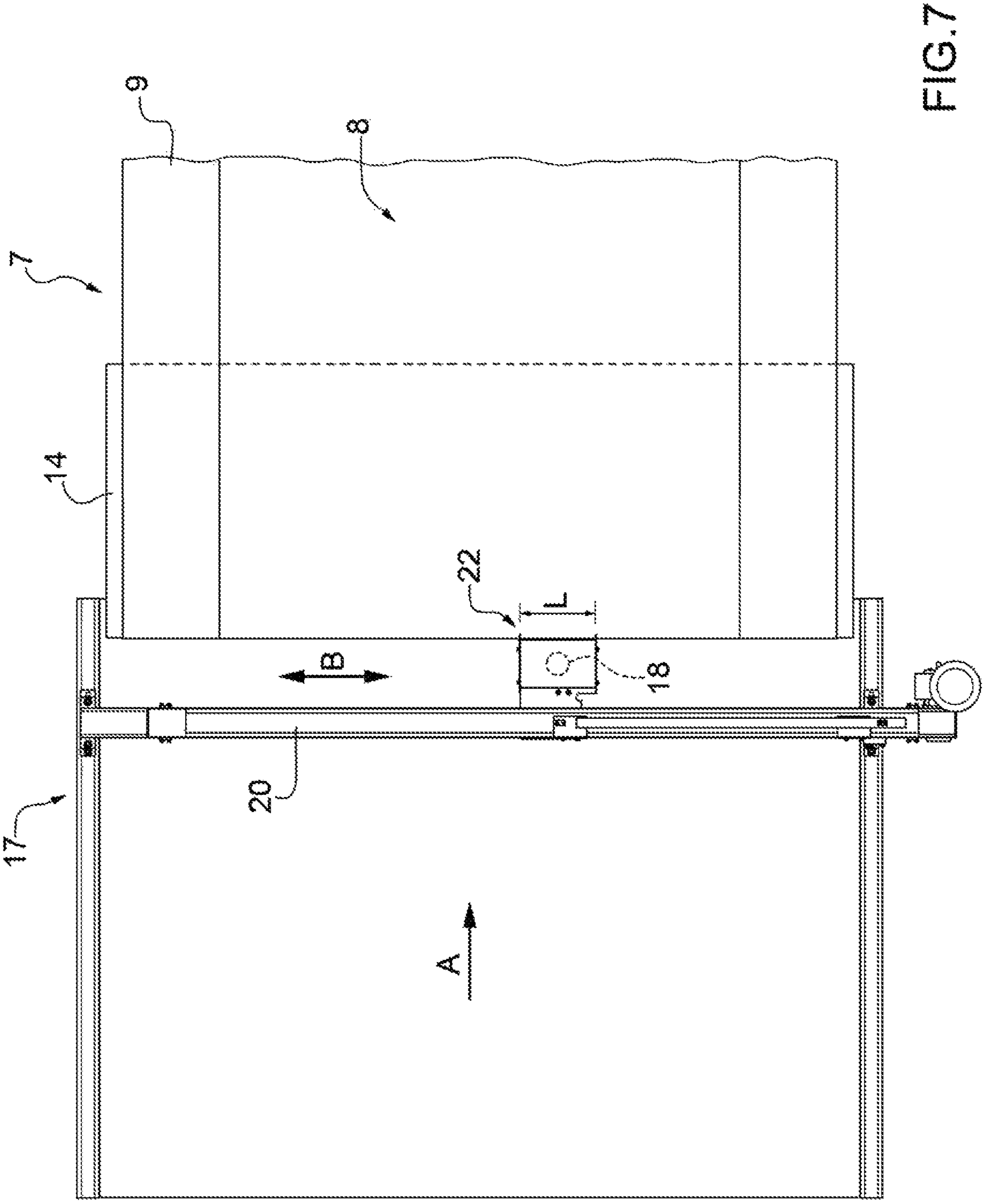
FIG. 7 is a top view of the part of FIG. 6.

With particular reference to FIGS. 2, 6 and 7, the compaction machine 2 comprises a front roller 13 and at least a rear roller 14, about which the pressure band is wound. In particular, at least one of the two rollers 13 and 14 is motorised so as to allow the pressure band to move through the work station 3 (in the direction A).

According to some non-limiting embodiments (see FIG. 2), the compaction machine 2 also comprises at least a pressure roller 15 and an actuator 16 (in particular, fluid dynamic) adapted to push the pressure roller 15 towards (downwards and towards) the conveyor assembly 4.

The pressure roller 15 is adapted to exert a pressure on the pressure device 7 (in particular, on the pressure band) to compress the powder material CP so as to obtain a layer of compacted powder material KP with the structured surface.

In use, the superficial layer 11 (which defines the structured contact surface 8) comes into contact with the powder material CP and at least part of the superficial layer 11 wears so as to uncover at least part of the layer 10 and obtain at least areas of the outwardly exposed layer 10 (FIG. 5).

The compaction machine 2 further comprises a hardening device 17 (FIGS. 2, 6 and 7) which is adapted to harden (in particular, by emitting electromagnetic radiations) at least part of the areas of the outwardly exposed layer 10.

Advantageously but not necessarily, the hardening device 17 comprises a radiation source 18, which is adapted to emit electromagnetic radiations towards the pressure device 7 (more precisely, the pressure band), in particular towards the areas of the outwardly exposed layer 10.

According to some non-limiting embodiments, the radiation source 18 is adapted to emit in the ultraviolet and/or in the infrared (in particular, in the ultraviolet). More precisely, the source 18 emits at least in the UVC. Advantageously but not necessarily, the source 18 emits in the UVA, in the UVB and in the UVC.

Advantageously but not necessarily, the hardening device 17 comprises a handling assembly 19 to move the source 18 in a direction B transverse (in particular, substantially perpendicular) to the advance direction A. More in particular, the handling assembly 19 comprises a cross member 20 (more precisely, supported by two uprights 21 arranged at the sides of the first segment PA) and an assembly 22, which is adapted to move along the cross member 20 and provided with the source 18.

According to alternative embodiments, the source 18 is static and has a width at least equal to the width (transverse to the direction A) of the pressure device 7 (pressure band), more precisely at least equal to the width of the contact surface 8 (in particular, of the layer 10).

In these cases, the source 18 can for example have an elongated shape. Alternatively or additionally, a series of sources 18 can be provided arranged in succession transversal to the direction A (in particular, in the direction B).

Advantageously but not necessarily, the hardening device (in particular, the source 18) is arranged at the rear roller 14.

According to some non-limiting embodiments, the source 18 is a mercury lamp and/or an LED (in particular, a mercury lamp).

Figure 8:
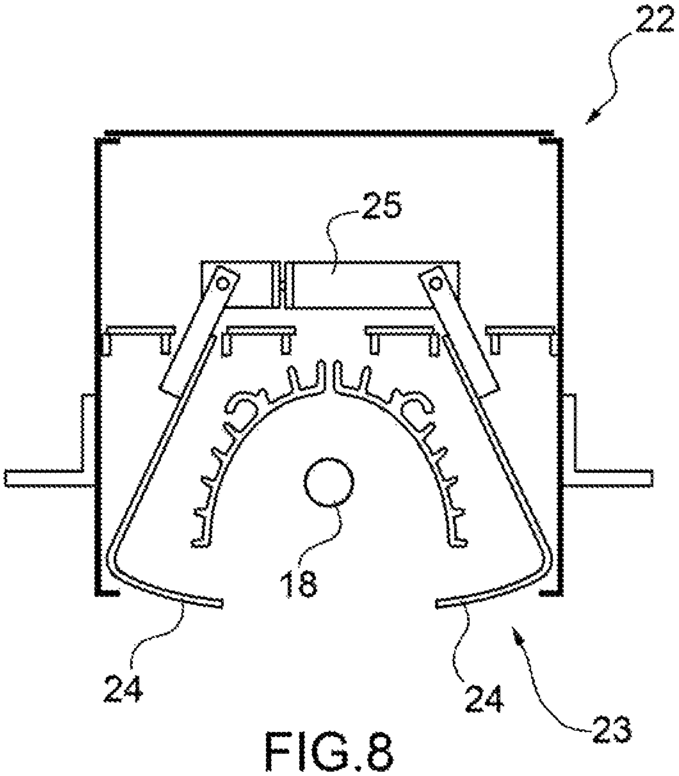
FIG. 8 schematically illustrates a detail of the part of FIG. 6.

Advantageously but not necessarily (in particular, when the source 18 comprises a mercury lamp), the hardening device 17 comprises a diaphragm system 23 (FIG. 8) adapted to obscure the source 18 (when it is not required to irradiate the contact surface 8). This is particularly useful when the source 18 comprises a mercury lamp or another type of lamp that requires a considerable amount of time to become “activated” and emit the desired wavelengths.

In these cases, in particular, the diaphragm system 23 comprises a pair of baffles 24 that are moved by a pneumatic or electric actuator 25.

According to some non-limiting embodiments (see in particular FIG. 1), the plant 1 also comprises a feeding assembly 26, which is adapted to feed the ceramic powder CP to the conveyor assembly 4 at the input station 5. In particular, the feeding assembly 26 feeds the ceramic powder CP to the conveyor assembly 4 in a substantially continuous manner.

According to some embodiments, the conveyor assembly 4 comprises a conveyor belt 27 extending (and adapted to move) from the input station 5 and through the work station 3, along the (more precisely, part of the) aforesaid given path.

In some cases, the feeding assembly 26 is adapted to carry the powder material CP (not compacted) to (onto) the conveyor belt 27 (at the input station); the compaction machine 2 is adapted to exert pressure on the powder material CP transverse (in particular, normal) to the surface of the conveyor belt 27.

According to some non-limiting embodiments (FIG. 2), the compaction machine 2 comprises at least two pressure rollers 15 and 15' arranged on opposite sides of (above and below) the conveyor belt 27 to exert a pressure on the powder material CP so as to compact the powder material CP.

Alternatively or additionally, it is also possible to provide a plurality of compression rollers 28 arranged above and below the conveyor belt 11, for example as described in the patent EP1641607B1.

Advantageously (as in the embodiment illustrated in FIG. 2) but not necessarily, the belt of the pressure device 7 converges towards the conveyor belt 11 in the advance direction A in which the conveyor assembly 4 feeds the powder material CP to the compaction machine 2. In this way, a pressure is exerted (from the top downwards) that increases gradually in the direction A on the powder material CP so as to compact it.

According to specific non-limiting embodiments (such as those illustrated in FIGS. 1 and 2), the compaction device also comprises an counter belt 29 arranged on the opposite side of the conveyor belt 27 (in particular, made of rubber or a similar material) relative to the pressure band 7 to co-operate with the conveyor belt 27 to provide an adequate opposition to the downward force exerted by the pressure band 7. In these cases, in particular, the counter belt 29 is (mainly) made of metal (steel) so that it substantially cannot be deformed while pressure is exerted on the ceramic powder.

According to some embodiments not illustrated, the counter belt 29 and the conveyor belt 27 are the same. In other words, the conveyor belt 27 is (mainly) made of metal (steel) and the counter belt 29 is absent.

Advantageously but not necessarily, the conveyor belt 27 ends at (the end of) the work station 3. In these cases, the conveyor assembly 4 comprises at least a further conveyor belt (or a roller conveyor), which is arranged immediately downstream of the compaction machine 2 and is adapted to feed the layer of compacted powder material KP (in the direction A) at a different speed (in particular, greater) relative to the speed with which the conveyor belt 27 conveys the ceramic powder CP to (and through) the work station 3. More precisely, the speed of the further conveyor belt adapts (corresponds) to the speed with which the layer of compacted powder material exits the compaction machine 2.

Figure 9:
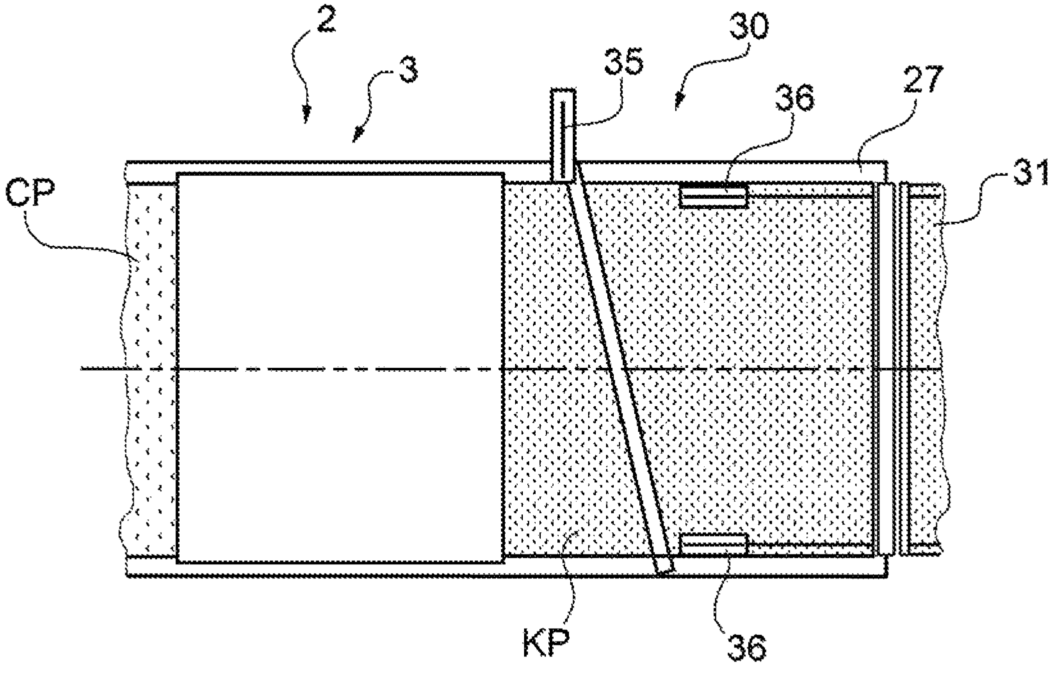
FIG. 9 is a top view of a part of the plant of FIG. 1.

According to some non-limiting embodiments (FIGS. 1 and 9), the plant 1 comprises at least one cutting assembly 30 to transversally cut the layer of compacted powder KP so as to obtain a base article 31, which is a portion of the layer of compacted powder KP.

In particular, the cutting assembly 30 is arranged along the path P (more in particular, downstream of the compaction machine 2). Advantageously but not necessarily, the conveyor assembly 4 is adapted to feed the layer of compacted powder KP to the cutting assembly 30 and convey the base article 31 downstream of the cutting assembly 30.

According to some non-limiting embodiments, the plant 1 further comprises a dryer 32 (FIG. 1) arranged along the second segment PB of the given path downstream of the compaction machine 2 (more precisely, downstream of the cutting assembly 30).

According to some non-limiting embodiments, the plant 1 also comprises at least one kiln 33 to sinter (the layer of compacted powder KP) of the base article 31 so as to obtain the ceramic product T. In particular, the kiln 33 is arranged along the second segment PB of the given path downstream of the compaction machine 2 (and downstream of the dryer 32).

According to some non-limiting embodiments, a printing unit 34 can be provided to decorate the surface of at least one portion of the layer of compacted powder KP (in particular, of the base article 31).

Typically, but not necessarily, the printing unit 34 is arranged upstream of the kiln 33 (and, in particular, downstream of the dryer 32).

Advantageously but not necessarily (in particular see FIG. 9), the cutting assembly 30 comprises a cutting blade 35, which is adapted to come into contact with the layer of compacted powder material KP to cut it and a handling unit to move the cutting blade 35 along a trajectory diagonal relative to the direction A. In this way, it is possible to provide the base articles 31 with end edges substantially perpendicular to the direction A while the layer of compacted powder material KP is fed with a continuous movement.

According to some embodiments, the cutting assembly 30 also comprises two further blades 36, which are arranged on opposite sides of the segment PB and are adapted to cut the layer of compacted powder material KP and define side edges of the base articles 31 substantially perpendicular to the end edges (and substantially parallel to the direction A). In some specific cases, the cutting assembly 30 is as described in the patent application with publication number EP1415780.

Advantageously but not necessarily, the compaction machine 2 also comprises a cleaning system (not illustrated) to remove any residues of powder material CP (and/or of the superficial layer 11) from the pressure device 7 (more precisely, from the contact surface 8).

In this way, any elements that can obscure (cover) the layer 10 (and/or the layer 12) are removed; more precisely, the areas of the layer 10 and/or of the layer 12 outwardly exposed) are removed while the source 18 irradiates the pressure device 7. The presence of the cleaning system therefore enables a more efficient hardening to be obtained of the areas of the layer 10 and/or of the layer 12 outwardly exposed.

According to some non-limiting embodiments, the cleaning system comprises a system of brushes transverse to (or that move transversally relative to) the direction A and/or a suction system for the collection of residues of powder material CP (and/or of the superficial layer 11).

According to an aspect of the present a method for compacting a powder material CP invention is provided. Advantageously but not necessarily the method is implemented by the compaction machine 2 as described above.

The method comprises at least a first compacting step, during which the powder material CP is compacted, at a work station 3, so as to obtain a layer of compacted powder material KP and a pressure device 7, having a structured contact surface 8, comes into contact with the powder material CP so that the layer of compacted powder material KP has a structured surface; and a conveying step, during which the powder material CP is conveyed (in particular, substantially continuously) along a first segment PA of a given path to the work station 3 (in particular, from the input station 5) and the layer of compacted powder material KP is conveyed from the work station 3 along a second segment PB of the given path.

The pressure device 7 comprises at least one layer 10 and a superficial layer 11 arranged (above the layer 10) so as to cover the first layer 10 at least partially relative to the outside (more precisely but not necessarily, the superficial layer 11 completely covers the layer 10).

During the first compacting step, the superficial layer 11 (which defines—at least partially—the structured contact surface 8) comes into contact with the powder material CP and at least part of the superficial layer 11 wears so as to uncover at least part of the layer 10 and obtain at least areas of the outwardly exposed layer 10 (FIG. 5).

The method further comprises at least a first hardening step, which is at least partially simultaneous and/or subsequent to the first compacting step and during which the areas of the outwardly exposed layer 10 are hardened.

In this way it has surprisingly been experimentally observed that the processing time (i.e., the time for which it can be used maintaining an adequate quality of the structured effect on the layer of compacted powder material KP) of the pressure device 7 increases considerably.

Advantageously but not necessarily, the layer 10 comprises (in particular, is made of) at least a polymer material and during the first hardening step the polymer material of the layer 10 is cross-linked.

Advantageously but not necessarily, during the first hardening step, the areas of the outwardly exposed layer 10 are irradiated, in particular with at least an electromagnetic radiation. According to some non-limiting embodiments, the areas of the outwardly exposed layer 10 are irradiated by the hardening device 17 as described above (in particular by the source 18).

According to some non-limiting embodiments, during the first hardening step, the areas of the outwardly exposed layer 10 are irradiated with at least a UV radiation.

In particular, during the first hardening step, the areas of the outwardly exposed layer 10 are irradiated with specific energy (also called exposure) of at least 5 $J/m^2$ (more in particular, at least 6 $J/m^2$). More precisely but not necessarily, the areas of the outwardly exposed layer 10 are irradiated with specific energy up to (less than or equal to) 13 $J/m^2$ (more in particular, up to 12 $J/m^2$).

In these cases, the specific energy (also called exposure) is expressed relative to the surface extension of the areas of the outwardly exposed layer 10.

In particular, the specific energy ES is estimated considering the power P of the emission source, the time T in which a material (for example areas of the outwardly exposed layer 10) is exposed to irradiation and the surface S of the material (for example, the areas of the outwardly exposed layer 10), considering the following relation:

$$ES=P\times T/S$$

In particular, the pressure device 7 comprises (in particular, is) a pressure band.

According to some non-limiting embodiments, the contact surface 8 (and/or the structured surface of the layer of compacted powder material KP) has ridge-valley height differences up to 3 mm, more precisely up to 1 mm.

In particular, the contact surface 8 (and/or the structured surface of the layer of compacted powder material KP) has maximum ridge-valley height differences of at least 0.1 mm (more precisely, of at least 0.5 mm).

More precisely, the valleys and the ridges of the contact surface 8 are adapted to reproduce the aesthetic effect of natural materials such as wood and/or stone.

The contact surface 8 is defined by the superficial layer 11 and, as the superficial layer 11 becomes worn, by the layer 10.

Advantageously but not necessarily, the method comprises at least a second compacting step, during which the powder material CP is compacted, at the work station 3, so as to obtain the layer of compacted powder material KP and the pressure device 7, having the structured contact surface 8, comes into contact with the powder material CP so that the layer of compacted powder material KP has the structured surface.

In particular, the pressure device 7 comprises at least one layer 12. The layer 10 is arranged (above the layer 12) so as to cover the layer 12 at least partially (more in particular, completely) relative to the outside.

During the second compacting step, at least part of the layer 10 (which at least partially defines the structured contact surface 8) comes into contact with the powder material CP and wears so as to uncover at least part of the layer 12 and obtain at least areas of the outwardly exposed layer 12. In these cases, advantageously but not necessarily, the method comprises at least a second hardening step, which is at least partially simultaneous and/or subsequent to the second compacting step and during which, the areas of the outwardly exposed layer 12 are hardened.

In this way, it has surprisingly been experimentally observed that the operating time (i.e., the time for which it can be used maintaining an adequate quality of the structured effect on the layer of compacted powder material) of the pressure device 7 increases substantially. The aforesaid areas of the layer 12 are able to come into contact with the powder material CP reducing possible damages.

In this regard, it must be noted that as the layer 10 is consumed, the contact surface 8 is increasingly defined by the layer 12.

In particular, there is no interruption between the first compacting step and the second compacting step. Typically, but not necessarily, the second compacting step is at least partially subsequent to the first compacting step.

Advantageously but not necessarily, the layer 12 comprises (in particular, is made of) at least a polymer material and during the second hardening step the polymer material of the layer 12 is cross-linked.

Advantageously but not necessarily, during the second hardening step, the areas of the outwardly exposed layer 12 are hardened, in particular with at least an electromagnetic radiation. According to some non-limiting embodiments, the areas of the outwardly exposed layer 12 are irradiated by the hardening device 17 as described above (in particular by the source 18).

According to some non-limiting embodiments, during the first hardening step, the areas of the outwardly exposed layer 12 are irradiated with at least a UV radiation.

Advantageously but not necessarily, during the second hardening step, the areas of the outwardly exposed layer 12 are irradiated with specific energy of at least 5 $J/m^2$ (more in particular, at least 6 $J/m^2$). More precisely but not necessarily, the areas of the outwardly exposed layer 12 are irradiated with specific energy up to (less than or equal to) 13 $J/m^2$ (more in particular, up to 12 $J/m^2$).

According to some non-limiting embodiments, the pressure device 7 has a (continuous) base layer 9. In some cases (not necessarily), the base layer 9 comprises (more precisely is made of) metal and/or a composite material, which in turn comprises fibreglass, carbon and/or Kevlar. In particular, the base layer 9 comprises (more precisely is made of) (stainless) steel.

In particular, the superficial layer 11 is in direct contact with the layer 10 (and is bonded thereto).

In particular, the layer 10 is arranged between the superficial layer 11 and the base layer 9.

In particular, the layer 10 is in direct contact with the layer 12 (and is bonded thereto).

In particular, the layer 12 is arranged between the layer 10 and the base layer 9.

According to some non-limiting embodiments, the polymer material of the layer 10 comprises (consists of) one or more acrylic and/or epoxy polymers. In particular, the polymer material of the layer 10 comprises (consists of) one or more polymers as described in the patent application with publication number WO2016071304.

According to some non-limiting embodiments, the superficial layer 11 comprises (consists of) a polymer material, in particular one or more acrylic and/or epoxy polymers. In particular, the polymer material of the superficial layer 11 comprises (consists of) one or more polymers as described in the patent application with publication number WO2016071304.

Advantageously but not necessarily, the polymer material of the superficial layer 11 has a cross-linking degree greater than the cross-linking degree of the polymer material of the layer 10 (in particular, before the first hardening step).

The cross-linking degree of the material is measured by measuring the frequency attenuation characteristic of the double bond C═C through FT-IR analysis. The cross-linking degree is given by a scale obtained experimentally. For example, for acrylates one of the peaks of the double bond C═C at 809 $cm^{-1}$ or at 1407 $cm^{-1}$ and a reference peak selected time by time according to the specific material analysed are measured.

In particular, a first ratio between one of the peaks of the double bond and the reference peak is measured before cross-linking and a second ratio between the aforesaid peak of the double bond and the reference peak is measured after cross-linking; the complementary number of the ratio between the second ratio and the first ratio relative to one indicates the cross-linking percentage.

The smaller cross-linking degree of the layer 10 allows a better connection between the layer 10 and the superficial layer 11.

In particular (before the first hardening step), the polymer material of the layer 10 has a cross-linking degree less than or equal to 80% (more in particular, less than or equal to 75%). More precisely but not necessarily, the polymer material of the layer 10 has (before the first hardening step) a cross-linking degree of at least 65% (in particular, at least 70%).

According to some non-limiting embodiments, following the first hardening step, the polymer material of the layer has a cross-linking degree of at least 90% (in particular, at least 95%).

Advantageously but not necessarily, the material of the superficial layer 11 has a cross-linking degree of at least the 90% (in particular, at least 95%).

Advantageously but not necessarily, the superficial layer 11 and the layer 10 comprise (are made of) the same material (more precisely, the same polymer material). Alternatively, the superficial layer 11 comprises (is made of) a different material relative to the material of which the layer 10 is comprised (is made).

According to some non-limiting embodiments, the polymer material of the layer 12 comprises (in particular is) one or more acrylic and/or epoxy polymers. In particular, the polymer material of the layer 12 comprises (consists of) one or more polymers as described in the patent application with publication number WO2016071304.

Advantageously but not necessarily, the layer 12 and the layer 10 comprise (are made of) the same material (more precisely, the same polymer material). Alternatively, the layer 12 comprises (is made of) a different material relative to the material of which the layer 10 is comprised (is made).

In particular, the layer 12 is in direct contact with the layer 10 (and is bonded thereto).

In particular, the layer 12 is arranged between the layer and the base layer 9.

Advantageously but not necessarily, the polymer material of the superficial layer 11 has a greater cross-linking degree than the cross-linking degree of the polymer material of the layer 12 (before the second hardening step).

The low cross-linking degree of the layer 12 allows a better connection (adhesion) to the layer 10.

In particular, the polymer material of the layer 12 has (before the second hardening step) a cross-linking degree less than or equal to 80% (more in particular, less than or equal to 75%). More precisely but not necessarily, the polymer material of the layer 12 has (before the second hardening step) a cross-linking degree of at least 65% (in particular, at least 70%).

According to some non-limiting embodiments, the pressure device 7 comprises a contact coating, which comprises (consists of) the superficial layer 11, the layer 10, the layer 12 and a plurality of further layers arranged between the layer 12 and the base layer 9. In particular, the contact coating has a total thickness of around 1 mm. In particular, the further layers are defined as the layer 12.

Advantageously but not necessarily, the superficial layer 11 has a thickness from around 5 μm to around 15 μm (in particular, from around 8 μm to around 12 μm). Alternatively or additionally, the layer 10 has a thickness from around 5 μm to around 15 μm (in particular, from around 8 μm to around 12 μm). Alternatively or additionally, the layer 12 has a thickness from around 5 μm to around 15 μm (in particular, from around 8 μm to around 12 μm). Alternatively or additionally, the further layers each have a thickness from around 5 μm to around 15 μm (in particular, from around 8 μm to around 12 μm).

Advantageously but not necessarily, the superficial layer 11 has a hardness (measured in accordance with EN ISO 868:2003—reviewed and confirmed in 2013) greater than the hardness (measured in accordance with EN ISO 868: 2003—reviewed and confirmed in 2013) of the layer 10 (in particular, before the first hardening step).

In this way, it is possible to obtain a stronger connection between the superficial layer 11 and the layer 10.

Advantageously but not necessarily, the superficial layer 11 has a hardness (measured in accordance with EN ISO 868:2003—reviewed and confirmed in 2013) greater than the hardness (measured in accordance with EN ISO 868: 2003—reviewed and confirmed in 2013) of the layer 12 (in particular, before the second hardening step).

In this way, it is possible to obtain a stronger connection between the layer 10 and the layer 12.

According to some non-limiting embodiments, the method comprises a preparation step of the pressure device 7, which comprises:

a first deposition sub-step, during which at least the layer 10 is deposited on top of a base layer 9 (as defined above) of the pressure device 7; a first hardening sub-step, which is (at least partially) subsequent to the first deposition sub-step and during which the layer 10 is partially hardened (in particular, so as to have the respective cross-linking degree indicated above); a second deposition sub-step, which is (at least partially) subsequent to the first hardening sub-step and during which the superficial layer 11 is deposited on the layer 10; and a second hardening sub-step, which is (at least partially) subsequent to the second deposition sub-step and during which the superficial layer 11 is hardened to a greater extent than the extent to which the layer 10 is hardened during the first hardening sub-step (in particular, so as to have the respective cross-linking degree indicated above). In particular, during the second hardening sub-step, the polymer material of the superficial layer 11 is cross-linked more than the polymer material of the layer 10 during the first hardening sub-step.

Advantageously but not necessarily, the method comprises a third deposition sub-step, during which at least the layer 12 is deposited on top of (in particular on) a base layer 9 (as defined above) of the pressure device 7 (in this case, during the first deposition step, the layer 10 is deposited on the layer 12); a third hardening sub-step, which is (at least partially) subsequent to the third deposition sub-step (the first deposition sub-step is at least partially subsequent to the third hardening sub-step) and during which the layer 12 is partially hardened (in particular, so as to have the respective cross-linking degree indicated above).

During the second hardening sub-step the superficial layer 11 is hardened to a greater extent than the extent to which the first layer 12 is hardened during the third hardening sub-step (in particular, so as to have the respective cross-linking degree indicated above). In particular, during the second hardening sub-step, the polymer material of the superficial layer 11 is cross-linked more than the polymer material of the layer 12 during the third hardening sub-step.

Advantageously but not necessarily, during the first hardening sub-step, the layer 10 is irradiated with at least an electromagnetic radiation, in particular with at least a UV radiation. During the second hardening sub-step, the superficial layer 11 is irradiated with a further electromagnetic radiation (in particular with at least a UV radiation) with a specific surface energy ranging from 2 to 8 times (in particular, from 3 to 6 times) greater relative to the specific energy with which the layer 10 is irradiated during the first hardening sub-step. In particular, the layer 10 is irradiated with a specific energy relative to the surface of the layer ranging from 1 to 2 $J/m^2$; the superficial layer 11 is irradiated with a specific energy relative to the surface of the superficial layer 11 ranging from 6 to 12 $J/m^2$.

Additionally or alternatively, during the third hardening sub-step, the layer 12 is irradiated with at least an electromagnetic radiation, in particular with at least a UV radiation. During the second hardening sub-step, the superficial layer 11 is irradiated with a further electromagnetic radiation (in particular with at least a UV radiation) with a specific surface energy ranging from 2 to 8 times (in particular, from 3 to 6 times) greater relative to the specific energy with which the layer 12 is irradiated during the third hardening sub-step. In particular, the layer 12 is irradiated with a specific energy relative to the surface of the layer 12 ranging from 1 to 2 $J/m^2$; the superficial layer 11 is irradiated with a specific energy relative to the surface of the superficial layer 11 ranging from 6 to 12 $J/m^2$.

In particular, during the first compacting step, at least an area of the structured contact surface 8 and the powder material CP move in an advance direction A at least partially common (through the work station 3). During the first hardening step, at least the areas of the outwardly exposed layer 10 are irradiated by a radiation source 18 (as defined above) which is moved in a further direction B transversal to the advance direction A.

According to some non-limiting embodiments, the source 18 of radiations is moved in the further direction B while the area of the contact surface 8 and the powder material CP move (in particular, are conveyed) in the advance direction A; in particular, the source 18 is moved with a speed given by the following relation $$v_E = L/L_N v_c$$

wherein L is the emission width of the source 18 (i.e., the width of the opening through which the radiations of the source 18 pass), $L_N$ is the linear development of the contact surface (in the advance direction A), $v_c$ is the speed of the belt in the advance direction A, $v_b$ is the speed of the source 18 (in the direction B).

Advantageously but not necessarily, the method comprises a cleaning step which is at least partially subsequent to the first (and/or to the second) compacting step and at least partially before the first (and/or the second) hardening step. During the cleaning step, the contact surface 8 is cleaned (in particular, so as to remove any residues of powder material CP and/or of the superficial layer 11) from the pressure device 7 (more precisely, from the contact surface 8). During the cleaning step, the contact surface 8 is treated by means of brushes and/or suction and/or air jets.

Figure 10:
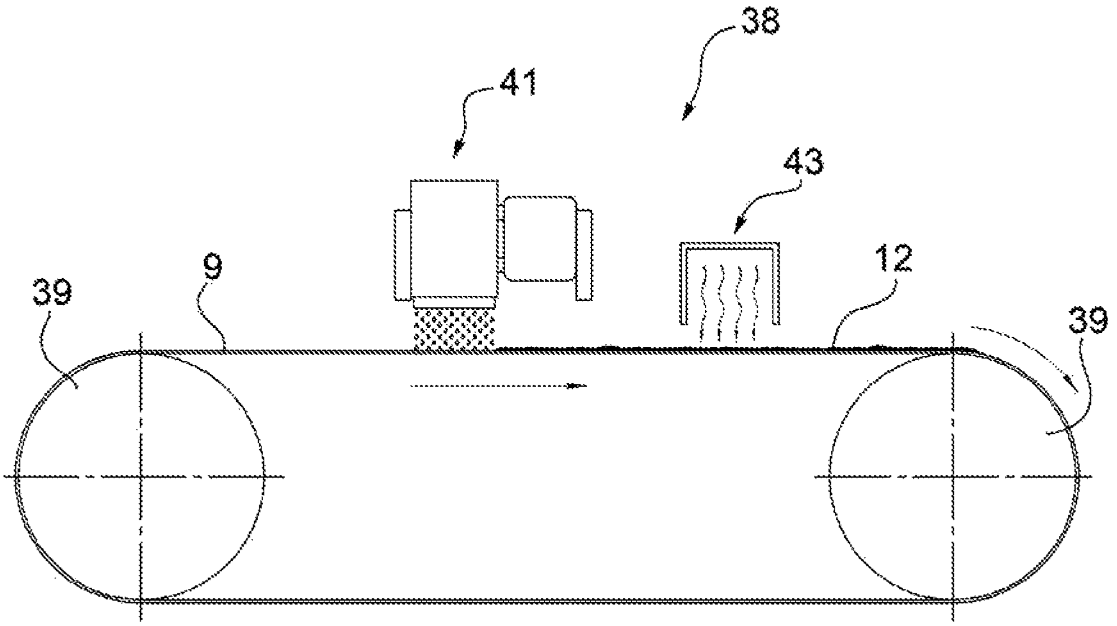
FIG. 10 is a schematic side view of a machine for manufacturing a component of the plant of FIG. 1.
Figure 11:
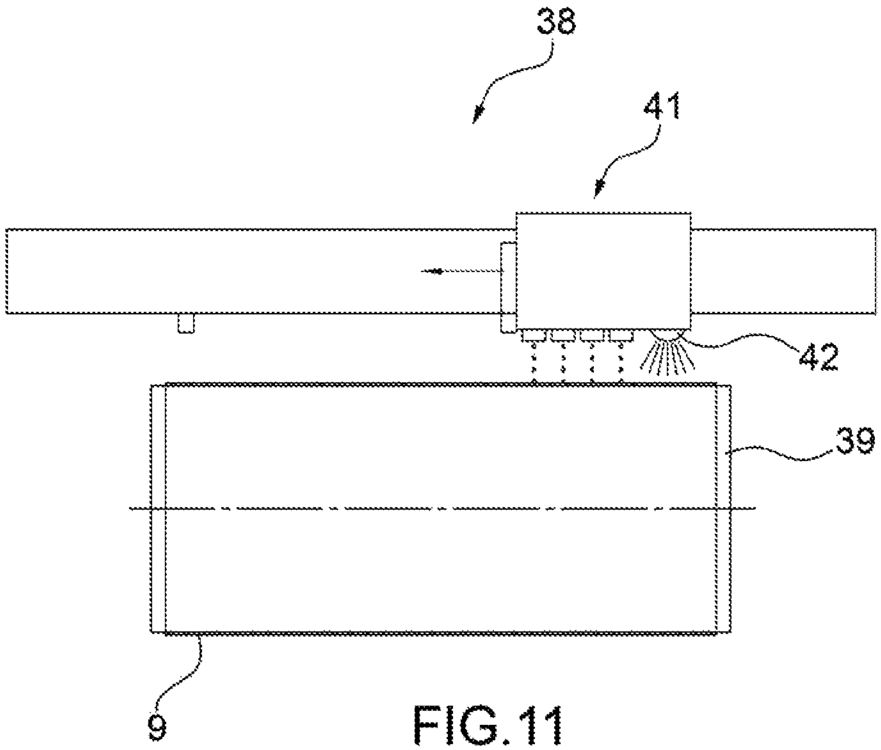
FIG. 11 is a front view of the machine of FIG. 10.

FIGS. 10 and 11 schematically illustrate a non-limiting example of a machine 38 to manufacture the pressure device 7 (pressure band). The machine 38 comprises a pair of rollers 39, at least one of which is motorized and on which the base layer 9 is mounted (closed—in particular, in a loop).

A beam 40 is also provided arranged above the rollers 39 (and the base layer 9), extending transversal to the base layer 9 and supporting a print head 41 provided with a plurality of inkjet heads and with a lamp 42 for emitting UV rays. Actuator means (known per se and not illustrated) are adapted to move the print head 41 along the beam 40.

The machine 38 also comprises a heat source 43 arranged downstream of the print head 41 relative to the direction of movement imposed by the rollers 39 on the base layer 9.

In use, while the base layer 9 is moved around the rollers 39 the print head 41 is operated so as to decorate a surface of the base layer 9 with a material (polymer material) as described above. The UV rays coming from the lamp 42 determine a first partial hardening of the ink. This hardening is terminated by the heat source 43 so as to obtain the aforesaid contact coating (and hence the pressure device 7). At this point, the pressure device 7 (pressure band) obtained is removed from the machine 38 and mounted on the machine 2 where it is used until replacement with a new pressure device.

Further features and details of the machine 38 and/or of the production of the pressure device 7 can be deduced from the patent application by the same applicant with publication number WO2015114433A1.

In accordance with a further aspect of the present invention, there is provided a procedure to manufacture ceramic products T. The procedure comprises a method for compacting a powder material CP as described above; a firing step, during which at least a portion of the layer of compacted powder material KP is fired (in particular, in the kiln 33).

Advantageously but not necessarily, the procedure is implemented by the plant 1 described above.

According to some non-limiting embodiments, the procedure comprises at least a cutting step, during which the layer of compacted powder KP is cut transversally so as to obtain a base article 31, which is a portion of the layer of compacted powder KP. During the firing step, the base article 31 is subjected to a temperature of at least 500° C. (in particular at least 900° C., more in particular at least 1000° C.).

Unless specifically indicated to the contrary, the content of the references (articles, books, patent applications etc.) cited in this text is fully incorporated herein. In particular, the references mentioned are herein incorporated by reference.

The invention claimed is:

1. A method for compacting a powder material comprising ceramic powder; the method comprises at least a first compacting step, during which the powder material is compacted, at a work station, so as to obtain a layer of compacted powder material and a pressure device, having a structured contact surface, comes into contact with the powder material so that the layer of compacted powder material has a structured surface; and a conveying step, during which the powder material is conveyed, along a first segment of a given path, to the work station and the layer of compacted powder material (KP) is conveyed from the work station along a second segment of the given path;

the pressure device comprises at least a first layer and a superficial layer arranged so as to at least partially cover the first layer relative to the outside;

during the first compacting step, the superficial layer comes into contact with the powder material and at least part of the superficial layer wears so as to uncover at least part of the first layer and obtain at least areas of the first outwardly exposed layer;

the method comprising at least a first hardening step, which is at least partially simultaneous to and/or subsequent to the first compacting step and during which the areas of the first outwardly exposed layer are hardened.

2. The method according to claim 1, wherein the first layer comprises at least a first polymer material and, during the first hardening step, the first polymer material is cross-linked.

3. The method according to claim 1, wherein, during the first hardening step, the areas of the first outwardly exposed layer are irradiated.

4. The method according to claim 3, wherein, during the first hardening step, the areas of the first outwardly exposed layer are irradiated with at least a UV radiation.

5. The method according to claim 3, wherein, during the first hardening step, the areas of the first outwardly exposed layer are irradiated with specific energy ranging from 6 to 12 $J/m^2$.

6. The method according to claim 1, wherein, before the first hardening step, the superficial layer has a greater hardness than the hardness of the first layer.

7. The method according to claim 1, wherein the first layer comprises a first polymer material and the superficial layer comprises a further polymer material, which has a greater cross-linking degree than the cross-linking degree of the first polymer material.

8. The method according to claim 1 and comprising a preparation step to prepare the pressure device, which comprises:

a first deposition sub-step, during which at least the first layer is deposited on top of a base layer of the pressure device;

a first hardening sub-step, which is at least partially subsequent to the first deposition sub-step and during which the first layer is partially hardened;

a second deposition sub-step, which is at least partially subsequent to the first hardening sub-step and during which the superficial layer is deposited on the first layer; and a second hardening sub-step, which is at least partially subsequent to the second deposition sub-step and during which the superficial layer is hardened to a greater extent than the extent to which the first layer is hardened during the first hardening sub-step.

9. The method according to claim 8, wherein the first layer comprises a first polymer material and the superficial layer comprises a further polymer material; during the first hardening sub-step, the first polymer material is cross-linked; during the second hardening sub-step, the further polymer material is cross-linked more than the first polymer material.

10. The method according to claim 9, wherein, during the first hardening sub-step, the first layer is irradiated with at least an electromagnetic radiation; during the second hardening sub-step, the superficial layer is irradiated with a further electromagnetic radiation with a specific energy that is 2 to 8 times greater than the specific energy used to irradiate the first layer during the first hardening sub-step.

11. The method according to claim 1 and comprising at least a second compacting step, during which the powder material is compacted, at the work station, so as to obtain the layer of compacted powder material and the pressure device, having the structured contact surface, comes into contact with the powder material so that the layer of compacted powder material has the structured surface;

the pressure device comprises at least a second layer; the first layer is arranged so as to at least partially cover the second layer relative to the outside;

during the second compacting step, at least part of the first layer comes into contact with the powder material and wears so as to uncover at least part of the second layer and obtain at least areas of the second outwardly exposed layer;

the method comprising at least a second hardening step, which is at least partially simultaneous to and/or subsequent to the second compacting step and during which the areas of the second outwardly exposed layer are hardened.

12. The method according to claim 11, wherein the second layer comprises at least a second polymer material and, during the second hardening step, the second polymer material is cross-linked.

13. The method according to claim 11, wherein, during the second hardening step, the areas of the second outwardly exposed layer are irradiated, in particular with at least an electromagnetic radiation.

14. The method according to claim 1, wherein, during the first compacting step, at least an area of the structured contact surface and the powder material move in an at least partially common advance direction; during the first hardening step, at least the areas of the first outwardly exposed layer are irradiated by a radiation source, which is moved in a further direction crosswise to the advance direction.

15. The method according to claim 14, wherein the radiation source is moved in the further direction while the area of the structured contact surface and the powder material move in the advance direction.

16. The method according to claim 14, wherein the radiation source is moved in the further direction while the area of the structured contact surface and the powder material move in the advance direction; the radiation source is moved with a speed given by the following equation $$v_B = \frac{L}{L_N} v_C$$

wherein L is the emission width of the radiation source, $L_N$ is the linear development of the entire structured contact surface, $v_c$ is the speed of the structured contact surface in the advance direction, $v_b$ is the speed of the radiation source.

17. A procedure for manufacturing ceramic products; the procedure comprises a method for compacting a powder material according to claim 1; a firing step, during which at least a portion of the layer of compacted powder material is fired.

18. The procedure according to claim 17 and comprising at least a cutting step, during which the layer of compacted powder is cut transversally so as to obtain a base article, which is a portion of the layer of compacted powder; during the firing step, the base article being subjected to a temperature of at least 500° C.

19. The method according to claim 1, wherein the pressure device comprises a pressure band.

20. The method according to claim 1, wherein, during the first hardening step, the areas of the first outwardly exposed layer are irradiated with at least an electromagnetic radiation.

21. The method according to claim 1, wherein the first layer comprises a first polymer material and the superficial layer comprises a further polymer material, which has a greater cross-linking degree than the cross-linking degree of the first polymer material before the first hardening step.

22. The method according to claim 1, wherein, during the first hardening sub-step, the first layer is irradiated with at least an electromagnetic radiation; during the second hardening sub-step, the superficial layer is irradiated with a further electromagnetic radiation with a specific energy that is 2 to 8 times greater than the specific energy used to irradiate the first layer during the first hardening sub-step; the first layer is irradiated with a specific energy relative to the first layer ranging from 1 to 2 $J/m^2$; the superficial layer is irradiated with a specific energy relative to the surface of the superficial layer ranging from 6 to 12 $J/m^2$.

* * * * *